April 21, 1953    J. J. FILLIUNG    2,635,691
FLUSH VALVE OPERATING ARRANGEMENT
Filed May 17, 1951
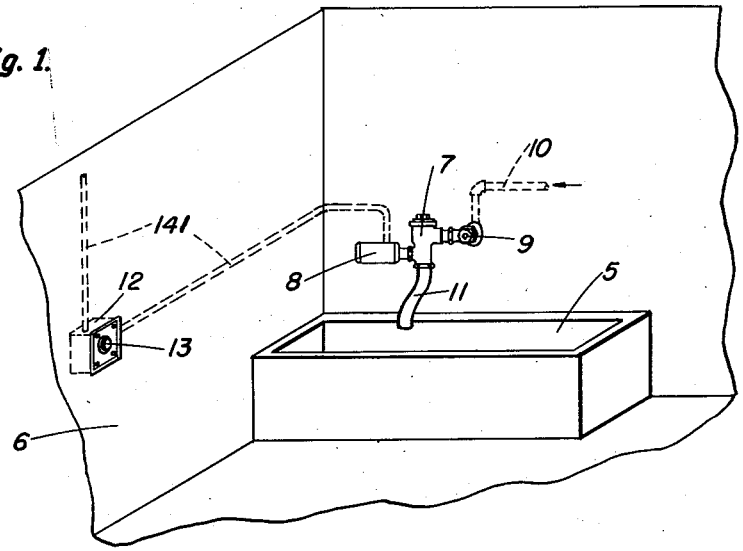
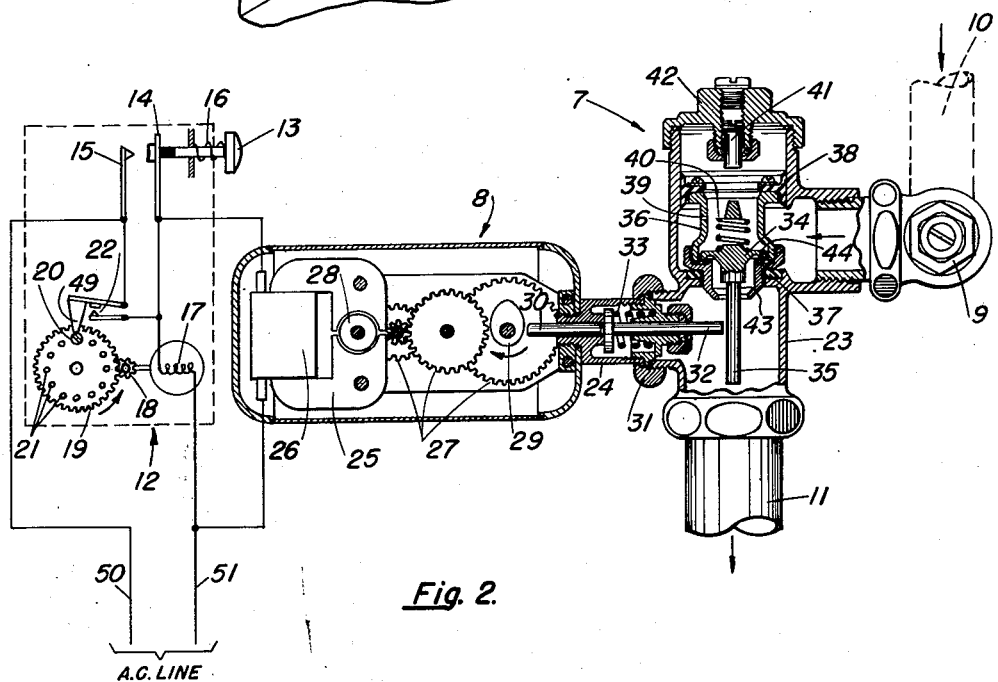
INVENTOR.
JACQUES J. FILLIUNG.
BY Parker + Carter
ATTORNEYS.

Patented Apr. 21, 1953

2,635,691

UNITED STATES PATENT OFFICE 2,635,691

FLUSH VALVE OPERATING ARRANGEMENT

Jacques J. Filliung, Chicago, Ill., assignor to Sloan Valve Company, Chicago, Ill., a corporation of Illinois Application May 17, 1951, Serial No. 226,819

15 Claims. (Cl. 161—7)

This invention relates in general to means for supplying a measured quantity of water to a tank or other reservoir and the principal object of the invention is to provide a new and novel arrangement for causing a valve to be operated for a predetermined time period in response to the operation of an electric switch.

Another object of the invention is to provide a new and novel operating arrangement of a flush valve normally set to deliver a fixed quantity of water each time it operates together with an electric operator controlled by a timing device for repeatedly operating the flush valve in response to the momentary operation of an electric switch, whereby a large quantity of water is delivered.

A further object is to provide a new and novel electric circuit arrangement between a flush valve electric operating device and an electric timing device, and between the timing device and an electric switch whereby the flush valve is caused to be repeatedly operated in response to only a momentary operation of the electric switch.

An additional object is to provide an arrangement for delivering a large quantity of water including a timing device for causing the holding open of a flush valve for a predetermined time interval, in which the time interval is adjustable for providing any quantity of water desired.

With the foregoing and other objects in view, the invention consists in certain novel features of construction, arrangement of parts and elements, and electric circuits which will be hereinafter fully described, claimed and illustrated in the accompanying drawing disclosing a preferred embodiment in which:

Fig. 1 is a perspective view of a typical installation showing the invention and Fig. 2 is a schematic circuit arrangement illustrating the electric circuit connections involved, together with a flush valve and motor operator illustrated in cross-section.

The invention is illustrated as being applicable to automatically fill up a tank or reservoir, such as may be used for watering stock on a farm, or for any industrial purpose where it is required that a tank be filled with a predetermined quantity of water. The customary procedure in the past for filling up tanks or reservoirs was to open a valve manually and then wait until the required level of the tank had been reached, whereupon the valve was shut off. Many times the person performing this operation would be too busy with other details and forget to shut off the valve with the result that the tank would overflow. In addition, in the event the volume of water required in the tank was large, it would be obvious that the person filling the tank would waste his time waiting for the tank to fill up. Also in many cases it is necessary that the exact amount of water or other fluid be controlled very accurately, especially where mixing operations are performed. The invention aims at overcoming the above objections by providing an arrangement whereby the mere momentary operation of a push button will cause a tank to fill up with water or other fluid to an exact predetermined quantity without further attention.

In the exemplification of the invention illustrated in Fig. 1, a suitable tank or reservoir is illustrated at 5, in a room 6, for example, which tank may be used for any purpose desired. A hydraulically operated flush valve indicated generally at 7 is placed preferably above the tank and has supported upon it an electric operating device indicated generally at 8. The flush valve 7 is provided with a regulating throttle or stop valve 9 to which the inlet water supply pipe 10 is connected. The outlet 11 from the flush valve 7 leads into the open tank 5. Arranged in close proximity to the tank 5, either recessed in the wall of the room 6 or at any other location, is a suitable box enclosing an electric timing device indicated generally at 12 and a manual operated push button 13 on the front of the box. Electric conduits 141 carry the electric supply line between the power source and box 12 and between the box 12 and the electric device 8.

Fig. 2 illustrates a diagrammatic circuit arrangement of the installation depicted in Fig. 1, including a cross section of the motor operator 8 and the flush valve 7 to better enable the internal mechanism to be described and illustrated. The push button 13 controls the closure of a pair of contact springs 14 and 15, and when released by restoring spring 16, permit these contacts to open again. Associated with the push button in the box 12 is an electric timing device of any well known construction including a small synchronous electric motor and coil 17, having a shaft upon which a spur gear 18 is mounted. Spur gear 18 meshes with a larger gear 19 and the gear ratio is preferably arranged so that the gear 19 makes one revolution in every five minutes. A cylindrical head screw 20 is screwed in any one of the series of holes 21 arranged near the periphery of the gear 19, and is adapted to contact and operate a cam member 49, which is arranged normally to hold open a pair of contact springs 22 whenever the screw 20 engages the cam 49. When the screw 20 is rotated past the cam 49, the contact springs are closed again.

Referring now to the electric operating device or motor operator 8, this is preferably of the type disclosed in applicant's Patent No. 2,552,625, issued May 15, 1951. It includes an enclosed casing for the motor which is supported upon the flush valve 7 in the manner shown, and is provided with side plates supporting a motor core 25 having an energizing coil 26 mounted thereon and a series of power transmitting gears 27 extending from the rotor 28 of the motor. The final gear 27 has a cam member 29 mounted on the same shaft which is adapted to rotate and actuate a plunger pin 30 extending through the front end of the motor. The pin 30 extends through a coupling member 24, having a coupling nut 31 upon it serving to clamp the whole motor unit directly onto the flush valve casing 23. A second plunger pin 32 extends through the coupling member 24 axially in line with the first pin 30. A restoring spring 33 enables both pins 32 and 30 to be retracted after every operation by the cam 29.

The flush valve 7 illustrated is a typical flush valve extensively used in connection with the flushing of water closets, urinals and the like, and may be of the type illustrated in Patent 2,046,004, issued June 30, 1936, to W. T. Sloan. This flush valve is hydraulically operated and arranged to pass a predetermined measured quantity of water each time it is tripped. The valve includes a body or casing 23 having therein an auxiliary valve 34 provided with a depending stem 35 adapted to be contacted or tripped by the plunger pin 32. The auxiliary valve head 34 is arranged inside of the operating piston 36 of the flush valve and seats upon a valve seat 44 in the piston. The piston has a bottom portion adapted to seat upon valve seat 37 arranged on an annular shoulder in the body 23. The piston also includes a rubber packing member 38 arranged in slidable engagement with the side walls of the body 23 to seal off the upper chamber in the valve body. Extending through one side wall of the piston, there is provided a small by-pass opening 39 for the passage of water into the upper chamber above the piston. A restoring spring 40 arranged between the top of the auxiliary valve 34 and a ledge on the piston body insures seating of the head of auxiliary valve 34 upon its valve seat 44 in the bottom of the piston. A depending cylindrical portion 43 of the piston passes below the main valve seat 37 in the body. To provide for suitable adjustment of the volume of water passed by the valve each time after it is tripped, an adjusting screw 41 extends through the cover 42 of the flush valve and limits the upward stroke of the piston 36.

In the ordinary opening operation of the flush valve 7, the plunger 32 contacts the side of the auxiliary valve stem 35, tilting the same, after which the plunger pin 32 is retracted. Tilting auxiliary valve stem 35 tilts the head portion 34 from off its valve seat 44. At this time, the inlet water pressure existing above the main valve seat 37 will be equal to that existing in the upper chamber of the valve above the piston by virtue of the by-pass opening 39. However, since the area above the piston 36 is greater than that below the piston, the piston will be held tight on its seat 37. Immediately, however, that the auxiliary valve 34 is tilted, the pressure above the piston is relieved, causing the water to flow through the outlet 11 and the inlet water pressure forces the piston 36 upwardly off of the main seat 37, permitting full flow through the flush valve. The stem 35 slides along the end of pin 32 and remains tilted while the auxiliary valve head 34 is carried along upward with the piston 36.

In the ordinary operation of the arrangement according to the invention, assume it is required that the tank 5 be filled to the desired level. The person doing this will momentarily press the push button 13, thereby closing contact springs 14 and 15. This establishes an energizing circuit extending from the alternating current line 50—51, preferably of 115 volts, 60 cycle frequency as universally used. One side of the line 50 extends to contact spring 15, and since contact spring 14 is closed thereon, the current passes through the coil winding 17 of the timer motor and back to the other side 51 of the line circuit. The timer coil 17 is thereby energized, rotating the gear 18 and large gear 19. This action causes screw 20 to pass from under the cam 49, thereby permitting contact springs 22 to close. After this occurs, the push button 13 is released by the person operating the same, and since this action occurs within one or two seconds, there will be sufficient time for the cam 49 to close contacts 22. The closure of contact springs 22 establishes another circuit path parallel to that from which the timer motor 17 was first energized by contacts 14 and 15, including the supply line conductors 50 and 51, and the coil winding 26 of the motor operator. It will be understood that the screw 20 will rotate with the gear 19 for a five minute period before it again contacts cam 49, again forcing open the contact springs 22. The timer coil 17 being in parallel circuit with the motor coil 26, both will now be energized as long as the timer contacts 22 remain closed. The motor coil 26 now energized rotates its rotor 28 and in turn the train of gears 27 and the cam 29 continuously.

The coil 26 and the coil 17 of the timer are arranged to provide for accurate timing, since they are energized by the 60 cycle alternating current. The motor operator rotates its final shaft at a speed of 10 R. P. M., which with the 60 cycle frequency current provides one revolution of the cam 29 every six seconds. Each time the cam 29 contacts the pin 30, it also pushes forward the associated pin 32 to contact and trip the auxiliary valve stem 35. This causes the flush valve to operate and raise its piston 36 off of the seat 37, permitting water to flow from the inlet 10 through the flush valve and the outlet 11 into the tank 5. Ordinarily, the flush valve 7 is arranged and adjusted that it requires approximately 16 seconds from the time it has its auxiliary stem 35 tripped by plunger pin 32 until the piston again closes upon its seat 37. However, since the cam 29 operates the pin 32 every six seconds, it will be obvious that the piston 36 would never be permitted to close upon its seat 37 as long as the cam 29 was operating every six seconds. This is for the following reasons:

After the auxiliary valve 35 is tripped, as has been pointed out, the piston immediately rises from its seat 37, opening the valve. Now when plunger pin 32 is retracted, the auxiliary valve stem 35 straightens out and closes its head 34 on seat 44. This permits the pressure to be again built up in the upper chamber above the piston 37 through the by-pass 39, so that the piston is slowly forced down on its seat 37. Since this action requires about 16 seconds, the piston would only travel less than six seconds before the cam 29 again caused the tripping of the auxiliary valve stem 35, and therefore only a small portion of the full downward travel of the piston would have ensued before it was again forced upward. The extent of this movement is so small that no appreciable difference in the rate of flow through the valve would take place.

Under ordinary operating circumstances, the flush valve 7 is arranged so that the rate of flow of the water through it will be approximately 30 G. P. M., assuming a water pressure of approximately 30 p. s. i. at the inlet supply line 10. When the flush valve is used for water closet purposes, the auxiliary valve is only tripped once and the valve permitted to close. Then the 16 second timing for the complete flushing operation would provide approximately five gallons of water in the tank 5. However, under the operating conditions according to the present invention, the motor operator is continuously operated for a period of five minutes by the timer 12, and it will be seen that for a 30 G. P. M. rate of flow, a total of 150 gallons of water will be passed into the tank 5.

After the five minute timing period has ensued, the screw 20 on the timer gear 19 will again come under the cam 49, thereby opening the contacts 22. This automatically disconnects the electric power source 50 and 51 from the timer coil 17 and the motor operator coil 26, stopping their operation and the equipment is at rest until the push button 13 is again operated.

It will be clear that in the example illustrated in describing the invention, the timer 12 may be set to operate for other than a five minute period, so that various amounts of water desired may be passed into the tank 5. These other adjustments providing for less than five minute periods are made by simply inserting additional screws 20 into the threaded holes 21 in gear 19. For example, if two screws 20 are spaced opposite one another, the timer will be operated for periods of 2½ minutes before cutting itself off. Likewise, the gear ratio of gears 18 and 19 may be changed to give a different time period. Instead of the motor operator 8 having a final shaft rotation of 10 R. P. M., any other operating cycle may be provided. The rate of flow in the flush valve, as has been pointed out, may also be appropriately regulated by the throttle valve 9 in any manner desired. Once the adjustments have been made to provide a desired filling in the tank 5, the equipment will operate to perform the action indefinitely in an accurate and reliable manner.

From the foregoing, it will be seen that a new and novel arrangement is provided for filling up a tank with a predetermined quantity of water by simply operating a push button. Great accuracy in the amount of water desired, as well as time and labor saving in performing the operation, is thereby achieved.

I have illustrated my invention by an electrically controlled timing and power control system which periodically actuates the flush valve at a periodicity less than the normal periodicity of operation of the flush valve so that the valve remains open for an extended period of time substantially longer, perhaps many times longer than its normal period of opening. This, of course, is a new use for the conventional type of automatic seating flush valve.

Any mechanism which will periodically actuate the valve can be used. A hydraulic motor and control mechanism, a pneumatic motor and control mechanism, either one might be substituted for the conventional electric timing mechanism.

What I claim is:

1. In a flush valve operating arrangement for delivering a large quantity of water including a flush valve normally operative to provide a smaller fixed amount of water for each operation thereof, an electric operator normally operated once for causing a single operation of said flush valve, a timing device for operating said electric operator, an electric switch for controlling said timer, and means responsive to the momentary operation of said electric switch for causing said timer to operate said electric operator for a predetermined time interval whereby said flush valve is held continually operated by repeated operation of said electric operator to provide a quantity of water larger than that delivered by a single operation of the flush valve.

2. In a flush valve operating arrangement for delivering a large quantity of water including a flush valve normally operative to provide about five gallons of water for each operation thereof, an electric operator arranged to control said flush valve in a manner to repeatedly operate the same to maintain it in continuous open flushing condition, a timing device for controlling said electric operator for a predetermined time interval after which said timing device stops the operation of said electric operator and also stops itself, and an electric switch momentary operated and then released for initiating the operation of said timer device whereby said flush valve is caused to be repeatedly operated and held open to provide a larger quantity of water than it normally does.

3. In a flush valve operating arrangement for delivering a large quantity of water from a flush valve normally set to provide a smaller fixed quantity each time it is momentarily tripped and operated, an electric operator connected to said flush valve for normally causing a single operation thereof by a single tripping action of the same, a timing device connected to said electric operator for continuously operating said electric operator for a predetermined time interval to repeatedly trip said flush valve whereby a large quantity of water is delivered by said flush valve, an electric switch connected to said timing device momentarily operated for initiating the operation of said timing device, means in said timing device for continuing its operation for a predetermined time interval independently of said electric switch, and means in said timing device for stopping the operation of said timing device after said predetermined time interval.

4. In a flush valve operating arrangement for delivering a large quantity of water from a flush valve normally set to provide a smaller fixed quantity each time it is momentarily tripped and operated, an electric operator connected to said flush valve for normally causing a single operation thereof by a single tripping action of said flush valve, a timing device for continuously operating said electric operator for a predetermined time interval to cause the flush valve to be repeatedly tripped whereby a large quantity of water is delivered, said timing device arranged to operate for said predetermined time interval and then to automatically stop itself, momentary operated electric means for starting the operation of said timing device, and electric circuit means interconnecting said momentary operated electric means with said timing device and said timing device with said electric operator.

5. In a flush valve operating arrangement for delivering a large quantity of water from a flush valve normally set to provide a smaller fixed amount of water each time it is tripped and operated, an electric operator for tripping said flush valve to normally cause a single operation thereof, a timing device for continuously operating said electric operator for a predetermined time interval to cause said flush valve to be repeatedly tripped whereby a large quantity of water is delivered, an electric switch momentarily operated for starting the operation of said timing device, said timing device arranged to operate automatically for a predetermined time interval after being started by said electric switch, electric circuit connections interconnecting said electric switch with said timing device and said timing device with said electric operator, and electric power means connected to said circuit connections to activate the same.

6. In a flush valve operating arrangement for delivering a large quantity of water from a flush valve normally set to provide a smaller fixed amount of water each time it is tripped and operated, an electric motor operator supported upon said flush valve for normally causing a single tripping operation of the same, a timing device for causing the operation of said motor operator for a predetermined time interval to repeatedly operate said flush valve and prevent it from shutting off whereby a large quantity of water is delivered, an electric switch for initiating the operation of said timing device, said timing device arranged to continue in operation for said predetermined time interval independent of said electric switch after which it is automatically stopped, electric circuit connections extending between said electric switch, said timing device and said motor operator, and an electric power source connected to said electric circuit.

7. In a flush valve operating arrangement for delivering a large quantity of water from a flush valve, said flush valve normally adjusted to deliver a small quantity of water when tripped and then shutting itself off automatically, an electric motor operator supported upon said flush valve for normally causing a single tripping operation of the same, a timing device for said motor operator, an electric switch for said timing device, circuit connection including a power source interconnecting said electric switch with said timing device and said timing device with said motor operator, means responsive to the momentary operation of said electric switch for completing an operating circuit for initiating the operation of said timing device, means in said timing device for completing an operating circuit for itself independent of said electric switch and for automatically disconnecting its operating circuit after a predetermined time interval, means in said timing device for completing an operating circuit for said motor operator and to continuously operate it for said predetermined time interval, and means in said motor operator for repeatedly tripping said flush valve before it can shut itself off whereby a large quantity of water is delivered.

8. In a flush valve operating arrangement for delivering a relatively large quantity of water, a flush valve adjusted to normally deliver about 5 gallons of water and arranged to be tripped and then to automatically shut itself off after operating for approximately 16 seconds, an electric motor supported upon said flush valve and arranged to normally require a 6 second operation for a single tripping action of the flush valve, a timing device arranged to operate for 5 minutes and then to shut itself off, an electric switch momentarily operated, circuit connections including a power source interconnecting said electric switch with said timing device and said timing device with said motor operator whereby the momentary operation of said electric switch initiates the operation of said timing device, said timing device causing the continuous operation of said motor operator for five minutes whereby said flush valve is repeatedly tripped to prevent it from shutting off until the large quantity of water is delivered.

9. In a flush valve operating arrangement for delivering a large quantity of water from a flush valve normally set to provide a smaller fixed quantity each time it is momentarily tripped and operated, an electric operator connected to said flush valve for normally causing a single tripping operation of said flush valve, a timing device for continuously operating said electric operator for a predetermined time interval to cause said flush valve to be repeatedly tripped whereby a large quantity of water is delivered, said timing device arranged to operate for said predetermined time interval and then to automatically stop itself, momentarily operated switch means for initiating the operation of said timing device, electric circuit means including a power source interconnecting said switch means with said timing device and with said electric operator, and means for adjusting the period of operation of said timing device whereby any desired quantity of water is delivered.

10. In a flush valve operating arrangement for delivering a large quantity of water from a flush valve normally set to provide a smaller fixed amount each time it is tripped and operated, an electric motor operator supported upon said flush valve for normally causing a single tripping action of the same, a timing device for causing the operation of said motor operator for a predetermined time interval to repeatedly operate said flush valve and prevent it from shutting off whereby a large quantity of water is delivered, an electric switch for initiating the operation of said timing device, said timing device arranged to continue in operation for said predetermined time interval independent of said electric operator, after which it is automatically stopped, means in said timing device for adjusting its predetermined time interval whereby any quantity of water desired may be delivered by the flush valve, and electric circuit connections including a power source interconnecting said timing device with said electric switch and with said motor operator.

11. In a flush valve operating arrangement for delivering a large quantity of water including a flush valve normally operative to provide a smaller fixed amount of water for each operation thereof, motor means for normally causing a single operation of said flush valve, a timing device for operating said motor means, a control member for controlling said timer, and means responsive to the momentary operation of said control member for causing said timer to operate said motor means for a predetermined time interval whereby said flush valve is repeatedly operated and held continually open to provide a quantity of water larger than that delivered by a single operation of the flush valve.

12. In a flush valve operating arrangement for delivering a large quantity of water including a flush valve normally operative to discharge a measured quantity of water for each operation thereof and then to close, motor means arranged to control said flush valve repeatedly in a manner to maintain it in continuous open flushing condition, a timing device for controlling said motor means for a predetermined time interval after which said timing device stops the operation of said motor means and also stops itself, and a control member momentary operated and then released for initiating the operation of said timer device whereby said flush valve is caused to be repeatedly operated to provide a larger quantity of water than it normally does in a single operation.

13. In a flush valve operating arrangement for delivering a large quantity of water including a flush valve normally operative to discharge a measured quantity of water for each operation thereof and then to close, an electric operator arranged to control said flush valve repeatedly in a manner to maintain it in continuous open flushing condition, a timing device for controlling said electric operator for a predetermined time interval after which said timing device stops the operation of said electric operator and also stops itself, and an electric switch momentary operated and then released for initiating the operation of said timer device whereby said flush valve is caused to be repeatedly operated to provide a larger quantity of water than it normally does in a single operation.

14. In combination, a liquid supply, a flush valve adapted to control the supply, the flush valve having as its characteristic that on each operation of the valve it remains open a predetermined length of time and then closes, automatic means for periodically operating the flush valve at a rate such that the automatic means operates the valve a plurality of times, each operation taking place before the normal closure of the flush valve, said automatic means comprising an electric operator for repeatedly actuating said flush valve to hold it open, an electric timer for controlling said electric operator, and means for initiating the start of said electric timer and then stopping its operation.

15. In combination, a source of fluid supply, a flush valve and means for opening it, hydraulically operated means within the valve for closing it after a predetermined lapse of time, and automatic means for biasing the flush valve to open position a plurality of times, each such biasing taking place before the normal closing of the flush valve, said automatic means comprising an electric operator for actuating said flush valve, an electric timer controlling said electric operator, and means for initiating the start of said electric timer and for stopping the same.

JACQUES J. FILLIUNG.

References Cited in the file of this patent

UNITED STATES PATENTS

| Number | Name | Date |
|---|---|---|
| 2,046,004 | Sloan | June 30, 1936 |
| 2,290,626 | Bosomworth | July 21, 1942 |
| 2,308,960 | Stevens | Jan. 19, 1943 |
| 2,388,990 | Nelson | Nov. 13, 1945 |
| 2,552,625 | Filliung | May 15, 1951 |